(12) United States Patent
Hauschulz et al.

(10) Patent No.: US 11,806,834 B2
(45) Date of Patent: Nov. 7, 2023

(54) APPARATUS AND METHOD FOR AUTOMATED MOLD POLISHING

(71) Applicant: PROTOLABS, INC., Maple Plain, MN (US)

(72) Inventors: Steven John Hauschulz, Chaska, MN (US); Matthew Knutson, Corcoran, MN (US)

(73) Assignee: PROTOLABS, INC., Maple Plain, MN (US)

( * ) Notice: Subject to any disclaimer, the term of this patent is extended or adjusted under 35 U.S.C. 154(b) by 0 days.

(21) Appl. No.: 17/969,765

(22) Filed: Oct. 20, 2022

(65) Prior Publication Data

US 2023/0127208 A1   Apr. 27, 2023

Related U.S. Application Data

(60) Provisional application No. 63/270,902, filed on Oct. 22, 2021.

(51) Int. Cl.
  *B24B 51/00*    (2006.01)
  *G05B 19/19*   (2006.01)
(52) U.S. Cl.
  CPC .............. *B24B 51/00* (2013.01); *G05B 19/19* (2013.01); *G05B 2219/35012* (2013.01); *G05B 2219/35167* (2013.01); *G05B 2219/45199* (2013.01)

(58) Field of Classification Search
  None
  See application file for complete search history.

(56) References Cited

U.S. PATENT DOCUMENTS

2023/0034765 A1\* 2/2023 Hane .................. B25J 9/1656

\* cited by examiner

*Primary Examiner* — Sean Shechtman
(74) *Attorney, Agent, or Firm* — CALDWELL INTELLECTUAL PROPERTY LAW

(57) ABSTRACT

An apparatus for automated mold polishing is disclosed. In an embodiment, the apparatus comprises at least a processor and a memory communicatively connected to the processor. The memory containing instructions configuring the at least a processor to receive a finish assignment for at least a surface of a part for manufacture. The processor then determines a polish strategy for the at least a surface as a function of a geometry of the at least a surface. A polishing tool may then be selected for the at least a surface as a function of the finish assignment and the polish strategy for the at least a surface. A reachable area is then determined of the at least a surface as a function of the polishing tool. The processor then generates a toolpath as a function of the reachable area.

20 Claims, 7 Drawing Sheets

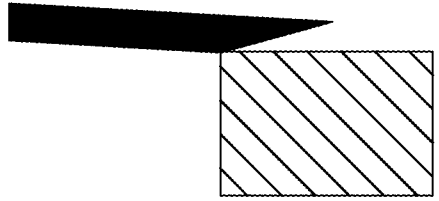

Too much pressure and the stone makes contact at the parting line and ends up rolling over the edge

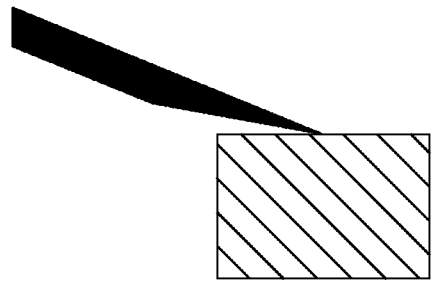

If enough pressure isn't applied then polishing doesn't occur above the contact point. The same defect we are trying to eliminate.

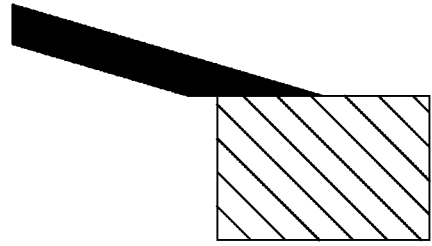

A large contact face allows the stone to slide past parting line and still maintain contact, but it is challenging to maintain this perfect alignment.

*FIG. 4*

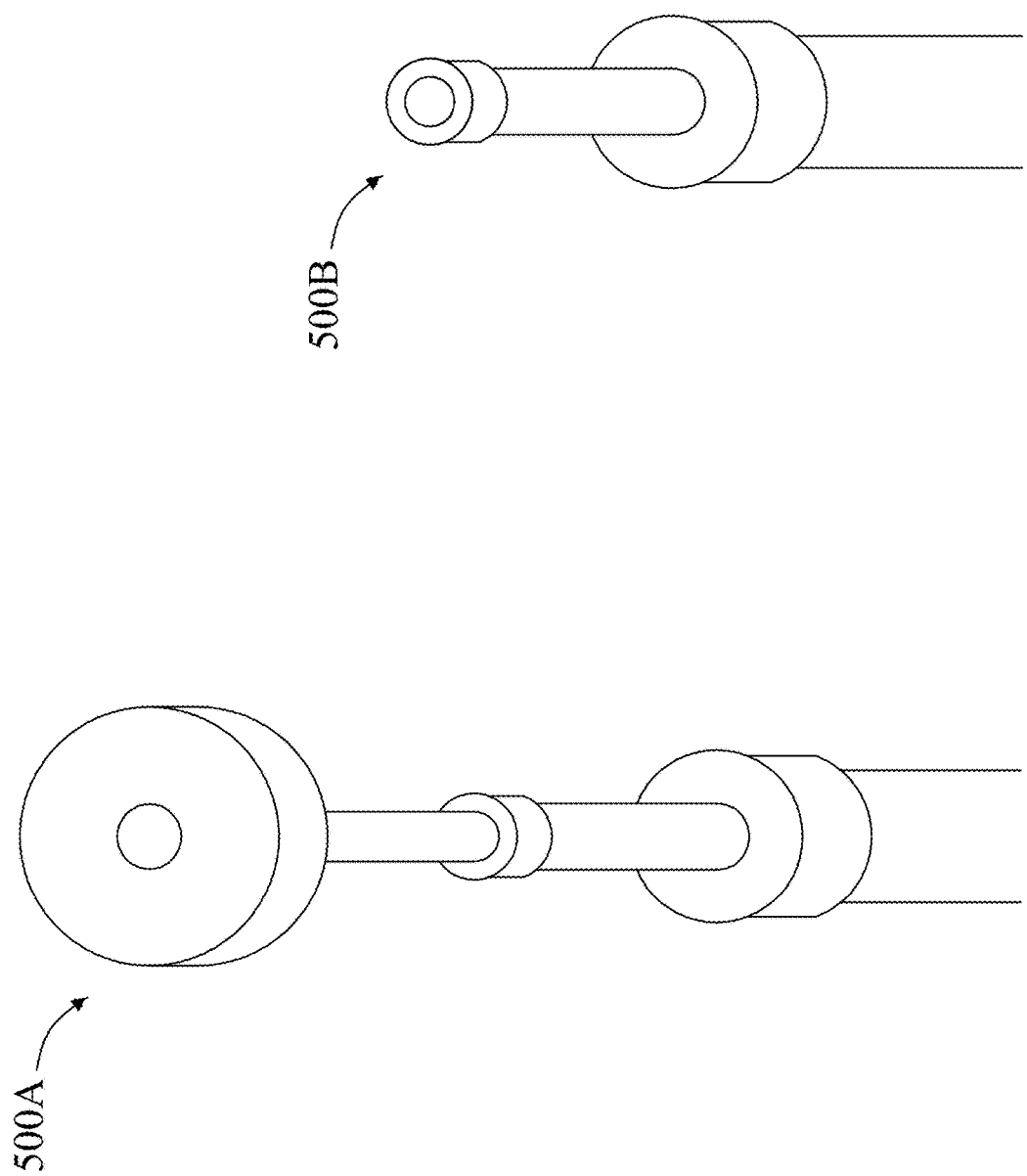

APPARATUS AND METHOD FOR AUTOMATED MOLD POLISHING

CROSS-REFERENCE TO RELATED APPLICATIONS

This application claims the benefit of priority of U.S. Provisional Patent Application Ser. No. 63/270,902, filed on Oct. 22, 2021, and titled "SYSTEMS AND METHODS FOR AUTOMATED MOLD POLISHING," which is incorporated by reference herein in its entirety.

FIELD OF THE INVENTION

The present invention generally relates to the field of automated manufacture. In particular, the present invention is directed to an apparatus and method for automated mold polishing.

BACKGROUND

Finish polishing freeform geometry is a very laborious, time-consuming, and fickle step within the process of manufacturing a mold for injection molding. In an era of ever-increasing automation, polishing remains an exclusively manual and human-dependent procedure. Due to human dependency, polishing also comes with a lot of inherent cost, mistakes, restrictions, inefficiencies, and lack of scalability.

SUMMARY OF THE DISCLOSURE

In an aspect, an apparatus for automated mold polishing is disclosed. In an embodiment, the apparatus comprises at least a processor and a memory communicatively connected to the processor. The memory containing instructions configuring the at least a processor to receive a finish assignment for at least a surface of a part for manufacture. The memory may also contain instructions configuring the at least a processor to make a determination of a polish strategy for the at least a surface as a function of a geometry of the at least a surface. Additionally, the memory may contain instructions for a processor to select a polishing tool for the at least a surface as a function of the finish assignment and the polish strategy for the at least a surface. The memory may contain instructions for a processor to determine a reachable area of the at least a surface as a function of the polishing tool. The memory may then contain instructions for the processor to generate a toolpath as a function of the reachable area.

In another aspect, a method for automated mold polishing is disclosed. The method includes receiving, using a processor, a finish assignment for at least a surface of a part for manufacture. The processor may determine a polish strategy for the at least a surface as a function of a geometry of the at least a surface. A polishing tool is then selected for the at least a surface as a function of the finish assignment and the polish strategy for the at least a surface. The processor determines a reachable area of the at least a surface as a function of the polishing tool. A toolpath is then generated as a function of the reachable area These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 illustrates an exemplary embodiment of a chisel-ended polishing tool end;

FIG. 5A is a depiction of an exemplary embodiment of a machining tool element with a polishing attachment;

FIG. 5B is a depiction of an exemplary embodiment of a machining tool element with a polishing attachment;

Figure 1:
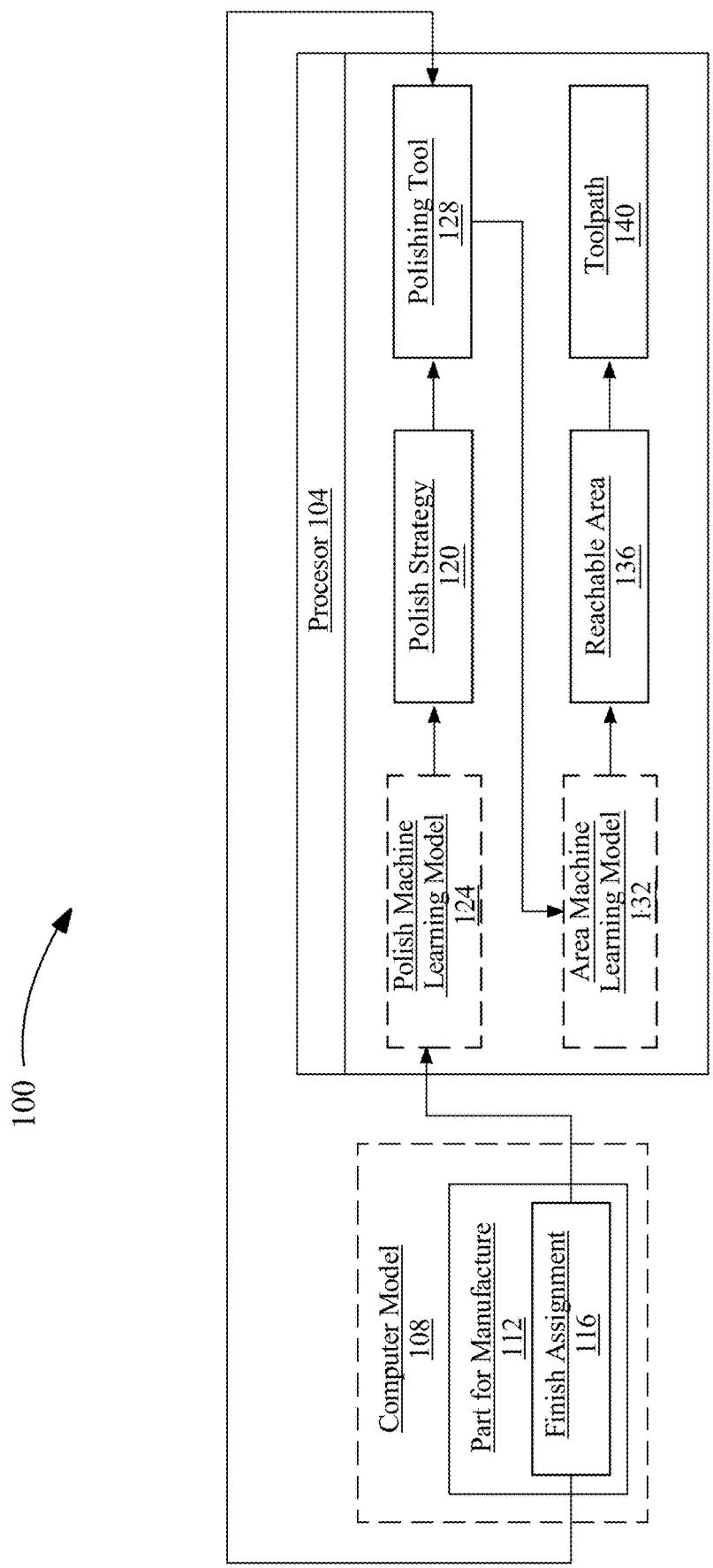
FIG. 1 is an exemplary block diagram of an apparatus for automated mold polishing.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for automated mold polishing. In an embodiment, the apparatus comprises at least a processor and a memory communicatively connected to the processor. The memory containing instructions configuring the at least a processor to receive a finish assignment for at least a surface of a part for manufacture. The processor then determines a polish strategy for the at least a surface as a function of a geometry of the at least a surface. A polishing tool may then be selected for the at least a surface as a function of the finish assignment and the polish strategy for the at least a surface. A reachable area is then determined of the at least a surface as a function of the polishing tool. The processor then generates a toolpath as a function of the reachable area. Exemplary embodiments illustrating aspects of the present disclosure are described below in the context of several specific examples.

Disclosed herein are embodiments of an apparatus and a method for automated mold polishing. Apparatus may include, without limitation, polishing tools mounted on rotating spindles, static spindles, and/or computer numerical control (CNC) machines and/or machine tools as described in further detail below. Tool ends and/or spindles may be free-floating, pivoting, flexing, and/or angled. Toolpaths may be designed and/or optimized for compatibility with particular tools, spindles, attachments, and/or mold shapes and/or features.

Molds, such as injection molds, compression molds, melt molds, and/or other types of molds, may have surface finish requirements for cosmetic and functional purposes. This finish may be passed onto plastic or other parts produced in these molds. Significant resources in the forms of tooling, machine time, and labor are consumed to achieve proper surface finish. In some embodiments, if a robot or CNC machine is able to perform polishing routines, it may be hypothesized that a majority of cost, mistakes, restrictions, inefficiencies, and lack of scalability may be eliminated, creating a much more efficient, accurate, repeatable, and scalable system. Embodiments described in this disclosure may act to reduce time and cost associated producing finished molds.

In some embodiments, the equipment used for manufacturing a part, such as adding, removing, polishing, and/or forming material may be of the computerized numerical control (CNC) type that is automated and operates by precisely programmed commands that control movement of one or more parts of the equipment to affect the material. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms.

Referring now to FIG. 1, an apparatus for automated mold polishing is illustrated. Apparatus 100 includes a processor 104. Processor 104 may include any computing device as described in this disclosure, including without limitation a microcontroller, microprocessor, and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may include a memory communicatively connected to processor 104. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, a memory may be configured to store information and/or datum related to apparatus 100, such as a finish assignment and/or a computer model of a part for manufacture as discussed below. In one or more embodiments, memory may be communicatively connected to a processor 104 and configured to contain instructions configuring processor 104 to execute any operations discussed in this disclosure. In one or more embodiments, memory 108 may include a storage device, as described further in this disclosure below.

Continuing to refer to FIG. 1, processor 104 is configured to receive a computer model 108 of a part for manufacture 112. Computer model 108 may include a plurality of sides.

A "part for manufacture," as used in this disclosure, is a part to be manufactured, wherein manufacturing may include any manufacturing process as described in the entirety of this disclosure. A part may include any item made of materials such as metals including, for example, aluminum, steel alloys, brass, and the like. A part may include materials such as, without limitation, plastics, such as nylon, acrylic, ABS, Delrin, polycarbonate, and the like, foam, composites, wood, etc. A part for manufacture 112 may include a mold used for injection molding. Injection molding may include a manufacturing process for producing parts by injecting molten material into a mold. Injection molding can be performed with a plurality of materials as mentioned herein above. Additionally, a plurality of materials may include, but is not limited to, metals, glasses, elastomers, confections, thermoplastic, thermosetting polymers, and the like. A part for manufacture 112 may include one or more surfaces. As used in the current disclosure, a "surface" is the outside part or uppermost layer of a part for manufacture 112. A surface may be continuous or divided into sections according to functionality, finish assignment 116, location, machineability, and/or operator preference. A surface may take on any number of a plurality of geometries.

Continuing to refer to FIG. 1, a "computer model", as described herein, is a digital model of a physical structure as created using computer-aided design (CAD) modeling software. Computer model 108 may include a three-dimensional image of part for manufacture 112. As used in this disclosure, a "three-dimensional image" is an image having, appearing to have, or displaying three dimensions, such as length, width, and height. For example and without limitation, computer-aided design (CAD) software may include SOLIDWORKS® software and/or CATIA software (available from Dassault Systèmes SolidWorks Corp, Waltham, Mass.), AUTOCAD® software and/or Fusion 360 software (available from Autodesk, Inc., San Rafael, Calif.), PTC Creo software (available from PTC, Inc., Boston, Mass.), Siemens NX software (available from Siemens PLM Software, Plano, Tex.) and MICROSTATION® software (available from Bentley Systems, Inc., Exton, Pa.), and the like. Computer model 108 may include any data describing and/or relating to a computer model of a part to be manufactured. Computer model 108 may include any modeling type, such as, without limitation, a wireframe, solid model and/or any combination thereof. Computer model 108 may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. Computer model 108 may further include information about the geometry and/or other defining properties of the structure of part for manufacture 112. Computer model 108 may include a polygon mesh, such as a collection of vertices, edges, and faces, which define the shape of computer model 108. For example and without limitation, the faces of the polygon mesh may include triangles, such as a triangle mesh, quadrilaterals, or other simple convex polygons.

Still referring to FIG. 1, computer model 108 may include a plurality of sides of part for manufacture 112. Each side of the plurality of sides, as used in this disclosure, may be a view of computer model 108 from a plane orthogonal to an axis passing through an origin of computer model 108. An axis may include, as a non-limiting example, a three-axis coordinate system, such as the x-axis, y-axis, and z-axis, or abscissa, ordinate, and applicate. An axis may include, as a further non-limiting example, any axis as a function of the origin. Persons skilled in the art, upon reviewing the entirety of this disclosure, will be aware of axes which may be suitable for use as each side of the plurality of sides consistently with this disclosure. The origin of the computer model, as described herein, is a fixed point of reference for computer model 108. For example and without limitation, the origin may include the center of mass, the geometric center, the center of a feature of the part, wherein a feature may be a hole, a well, a groove, a pocket, a channel, extruded volume, and the like. As a further example and without limitation, the origin may include any position of computer model 108.

Continuing to refer to FIG. 1, computer model 108 may include semantic information of part for manufacture 112. "Semantic information," as described in this disclosure, is data concerning and/or describing product and manufacturing information (PMI) and/or product life cycle management (PLM). PMI, as used in this disclosure, is data describing non-geometric attributes of a model of a part for manufacture, such as computer model 108, necessary for manufacturing the part, components of the part, and associated assemblies. For example and without limitation, PMI may include geometric dimensions and tolerances, 3D annotation and dimensions, surface finish, material specifications, and the like. PMI may include textual data, such as alphanumeric, punctuation, typographical symbols, character, string data, and/or any textual data as described in the entirety of this disclosure. PLM, as used in this disclosure, is any data concerning and/or describing management of the lifecycle of the part from inception, through engineering design and manufacture, to service and disposal of the manufactured part. PLM may include textual data, such as alphanumeric, punctuation, typographical symbols, character, string data, and/or any textual data as described in the entirety of this disclosure. In an embodiment, semantic information included in computer model 108 may be used in processes for pricing a part to be manufactured.

Still referring to FIG. 1, processor 104 may be configured to receive a finish assignment 116 for at least a surface of part for manufacture 112. As used in this disclosure, a "finish assignment" is a specified surface finish that is assigned to one or more surfaces of a part for manufacture 112. Surface finish may also be known as surface texture, surface topography, or polish. A finish may denote a nature of a surface as defined by the three characteristics of lay, surface roughness, and waviness. A finish may comprise small, local deviations of a surface from the perfectly flat ideal (a true plane). Finish assignment 116 may include a finish grade according to Surface Finish Standards (SPI) such as A-1, A-2, A-3, B-1, B-2, B-3, C-1, C-2, C-3, D-1, D-2, and/or D-3. Finish assignment 116 may be according to a maximum surface roughness, which may be designated by a roughness average (Ra). Finish assignment 116 may additionally include root mean square roughness (RMS), Maximum roughness Depth (Rmax), The Mean Roughness (Rz). In some embodiments, computer model 108 may include finish assignment 116, and processor 104 may be configured to retrieve finish assignment 116 from computer model 108. In some embodiments, finish assignment 116 may be a function of a functional requirement of part for manufacture 112. As used in this disclosure, "functional requirement" is a specification of a part for manufacture that must be satisfied for the part for manufacture to function according to an intended use. For example, part for manufacture 112 may include a channel for fine ball bearings, which may require A-2 finish to prevent any surface roughness from impeding movement of the ball bearings.

With continued reference to FIG. 1, spin polishing may not be able to replicate most SPI (Society of the Plastics Industry) surface finishes; spindle CNC polishing may be superior. In embodiments, a spinning polishing tool may not reproduce clean, linear polishing marks and scratches that are prevalent within all SPI finishes from "B1" to "D3". A key to matching standard and producing saturated, clean, and linear SPI finishes may be to lock a spindle in a single orientation and to perform a finish polishing in the same direction across the entire surface area that is receiving that finish. However, this may only be advantageous for final and/or "finishing" polishing passes which create a desired end-state.

With continued reference to FIG. 1, before performing a finishing passes of polishing, for instance to reach a desired SPI finish or desired aesthetic or roughness, surfaces-to-be-polished may be brought to a known, consistent, and physically flat state. Milling/cutting routines may leave small grooves or scallops on a surface finish of a mold after machining due to a shape of a tool and physics of a cut; in order to effectively polish this surface, these scallops may be polished down to the bottoms of the grooves—essentially creating a truly "flat" surface. Until this is done, artifacts of the tool marks may remain visible at higher polishing levels. This may be affected during a "polishing prep" step: an abrasive tool, or a sequential progression of abrasive tools depending on the desired end state, may be leveraged within a CNC machine spindle, and spun at a pre-determined RPM such as without limitation 5000 RPM. A spinning abrasive tool may contact a mold with a pre-determined amount of force and traverse surface areas of the mold which have been assigned for a specific surface finish. Spinning abrasive tool in this way may create a routine that can very efficiently and quickly reduce surface roughness and reach bottoms of scallops. An aesthetic of a surface after a spin preparation may appear unfinished—"muddiness" and swirl marks may exist. However, this surface is may now be in a prime state for further "finish" polishing as it is at a known, predictable, and repeatable surface roughness.

With continued reference to FIG. 1, numerous grit progressions may be necessary to reach higher end surface finishes without leaving visible scratch marks. This means that 7-8 different stone/abrasive grits may be applied to the same surface in sequence to reach an "A2" surface finish (i.e., 400 stone>600 stone>600 paper>1000 paper>2000 paper>4000 cloth>polishing compound). Skipping steps or grits is not possible in these scenarios. However, with CNC "polish preparation" it may be advantageously possible to skip a majority of progressions in most cases, greatly expediting the polishing process. This ability may allow for creation of a higher surface finish, i.e. "A2", in a fraction of the time with none of the manual, physical effort. In some embodiments, to produce a consistent finish a constant pressure between the work piece and the polishing tool may be maintained. CNC's may be designed to expect an unchanging tool length, which may not account for actively adapting to tool wear mid motion. In some embodiments, CNC's may be configured to adapt to tool wear mid process.

Still referring to FIG. 1, processor 104 may determine a polish strategy 120 as a function of a finish assignment 116 and/or geometric surface type. As used in the current disclosure, a "polish strategy" is the manner in which a region of a part for manufacture is polished. Polishing strategy 120 may be built upon the notion that the CAD faces of arbitrary surface geometry to be polished can be partitioned into one of three surface types. Each surface type may be polished using a different novel polishing tool design. These Surface types may include shallow, general, and steep. A shallow surface type may include any face such that the maximum draft of the face is no more than some defined maximum (e.g. 10 degrees). A steep surface type may include walls of a surface having between 0-5 degrees of draft. A general surface type may include a surface with angles between steep and shallow surface types. Polishing tools 128 used to polish these surfaces may be modeled like a flat endmill with an abrasive pad on the bottom. A steep surface type may include any face such that the minimum draft of the face is no less than some defined minimum (e.g. 10 degrees). Polishing tools 128 used to polish these surfaces may be modeled like a flat endmill with an abrasive pad on the side of the tool as shown by first polishing tool 500A in FIG. 5A. General surface types may include any face that is not considered to be in one of the above categories. Polishing tools 128 used to polish these surfaces may include modeled like a ball endmill with a curved abrasive pad. Polish strategy 120 may include a plurality of polishing processes, such as, but not limited to, cross polish, draw polish, and the like. A "cross polish" as used in this disclosure is a polish process in which scratch marks left from polishing are perpendicular to a direction in which a mold opens. A "draw polish" as used in this disclosure is a polish process in in which scratch marks left from polishing are parallel to a direction a mold opens. Polish strategy 120 may be especially important for injection molded parts. When ejecting injection molded parts, it may be desirable to have a part with a surface finish with scratches on steep B-side faces of the mold run perpendicular to the direction the mold opens to help ensure that the part sticks to the B-side and not A-side of the mold. A desire to ensure scratch marks run parallel to the direction the mold opens on steep A-side faces exists for similar reasons. To facilitate this desire when implementing machine mold polishing, two distinct techniques to polish steep surfaces may be implemented.

Still referring to FIG. 1, polish strategy 120 may include one or more strategy types for each surface type. For example, corresponding "shallow" and "general" polish strategies may exist for each of the "shallow" and "general" surface types. A surface type may also have more than one associated strategy. For instance, when ejecting injection molded parts, it may be desirable to manufacture the steep surface regions of the B-side of a mold with a surface finish of scratches which run perpendicular to the direction the mold opens (i.e. enact a "steep cross polish strategy") to help ensure that the part sticks to the B-side and not A-side of the mold. A desire to ensure scratch marks run parallel to the direction the mold opens (i.e. enact a "steep draw polish strategy") on the steep surface regions of the A-side of the mold exists for similar reasons. In some embodiments, polish strategy 120 may include a pressure level. A "pressure level" as used in this disclosure is an amount of force over an area of a surface. In some embodiments, polish strategy 120 may include various pressure levels for various surfaces, tools, and the like. In some embodiments, a surface may include a geometry. A geometry of a surface may include a surface roughness. A "surface roughness" as used in this disclosure is a shorter frequency of real surfaces relative to troughs. Surface roughness may be measured in profile roughness parameters, such as Ra. In some embodiments, polish strategy 120 may factor in a surface roughness parameter.

With continued reference to FIG. 1, polish strategy 120 may be calculated using a polish machine learning model 124. In embodiments, a polish machine learning model 124 may include a classifier, which may be consistent with the classifier disclosed with reference to FIG. 3. Inputs to the machine learning model may include a computer model 108 of the part for manufacture 112, a finish assignment 116, examples of other polish strategy 120, polishing tools 128 available, examples of past polishing tool selections 128, and the like. The output of the machine learning model may be a polish strategy 120 and a polishing tool 128 selection that reflects the current situation. Polish machine learning model 124 may by trained using polish training data. Polish training data may include a plurality of data entries containing a plurality of inputs that are correlated to a plurality of outputs for training a computing device 104 by a machine-learning process. Polish training data may include past computer models 108 or finish assignments 116 and corresponding past polish strategies and/or polishing tools 128. Polish training data may include correlations between past finish assignment 116, past polish strategy 120 and past polishing tools 128 selections. "Past," refers to the fact that the data was collected prior to the current polish strategy; however, past polish strategy 120 and past polish strategy, and past polishing tool selection need not have been calculated by processor 104. Polish training data may be stored in a database, such as a training data database, or remote data storage device, or a user input or device.

Still referring to FIG. 1, processor 104 may be configured to select a polishing tool 128 as a function of the finish assignment 116 and the polish strategy 120. As used in the current disclosure, a "polishing tool" is a tool used to apply a finish assignment a surface of a part for manufacture. In an embodiment, polishing tools may include rigid polishing tools, semi rigid polishing tools, custom profile polishing tools, conformable polishing tools, and the like. In other embodiments, polishing tools 128 may include a polishing stone, a polishing ceramic, felt bobs, felt cones, felt wheels, hard tip brushes, soft tip brushes, xebec stones, and the like. A person reasonably skilled in the art, upon reading this disclosure, would appreciate the plurality of tools that may be used to apply a finish assignment 116. In some embodiments, polishing tool 128 may be used within a CNC machine. Polishing tool 128 positioned inside a CNC machine may allow finish assignment 116 to be applied in an automated fashion. In an embodiment, polishing tool 128 may be connected to manufacturing tool 204. Polishing tool 128 may replace an endmill of manufacturing tool 204 of FIG. 2. In some embodiments, polishing tool 128 may be configured to maintain a stationary position. In other embodiments, polishing tool 128 may be configured to rotate about one or more axes. For instance and without limitation, polishing tool 128 may rotate about a horizontal axis, vertical axis, and/or any combination thereof. In embodiments, polishing tool 128 may be held at a single orientation so one or more stones may be dragged and polish in a linear fashion. Polishing tool 128 may be held at a consistent pressure and contact with the surface to produce desired finish assignment 116.

Still referring to FIG. 1, polishing tool 128 may include one or more polishing stones. As used in the current disclosure, a "polishing stone" is a stone used to apply a desired finish to a surface. In embodiments, a polishing stone may deform or be consumed as it is used to apply finish assignment 116. A polishing stone may also be considered a rigid polishing tool. Pressure may be transmitted to the stone by a telescoping segment using gravity, a spring or by running pressurized coolant or air thru the spindle. As the tool is consumed the telescoping segment continually compensates by moving towards the work surface as needed. A polishing stone may include Gesswein Stones. Polishing stones may include general types of grit used, silicon carbide used in the softer bond mold maker stones, and aluminum oxide used in the hard bond diemakers stones. Grits range from a course 100 mesh to a fine 1200 mesh. In embodiments, a polishing stone may be lubricated using kerosene or even an EDM electrolyte. Polishing stones may be available in many shapes and dimensions, but rectangular cross sections are most common. Tooling used in CNC mills may be almost exclusively round, so to accommodate rectangular cross sections, the spindle needs to be dynamically orientated, so the flat sides of the polishing stones are parallel with the edges or walls of the work piece (kept "normal" to your area being polished). This may be true for both horizontal and inclined surfaces.

Still referring to FIG. 1, a custom profile polishing tool may include both rigid and semi rigid polishing tools. Rigid and semi rigid polishing tools can be shaped using a diamond dressing tool to the complimentary geometry being polished. However just as before both tools are consumed during the polishing process, so they need to be paired with the appropriate axial or radial compensating tool holders. This may be done to maintain good contact with the work piece the tool and spindle centerlines need to remain parallel. For example, a diamond dressing tool may be mounted directly in a CNC machine to allow shaping each tool multiple times during the polishing process to accommodate multiple custom geometries as needed, but these tools could also be prepared separately outside of the mill.

Still referring to FIG. 1, conformable polishing tools unlike rigid and semi rigid may not dimensionally change radially or axially during use. The source of the polishing pressure is either provided directly by compressing the polishing material in the case of steel wool or scour pads, or by an open or close cell foam backing material like a sanding sponge. These can be produced in several shapes including cylinders, spheres, and flat tools. Only the starting abrasives at the boundary layer are available for polishing, so once consumed by ware the tool is no longer able to polish the work piece as intended. For that reason, on larger work surfaces multiple tools of the same grit can be required.

With continued reference to FIG. 1, abrasive polishing tools 128 may include, without limitation, diamond coated abrasive bits, steel wool, rubber bound mounted points, abrasive hand pads such as 3M Scotch-Brite Hand Pads and sanding sponge such as 3M Softback Sanding Sponge), or the like, with the pads particularly effective F1, C1, B1, A2 SPI surface. Custom tools may be created, without limitation, by punching and/or cutting out circular pieces of abrasive pad/sponge and adhering or otherwise mechanically coupling or attaching pieces to ends of dowels or rotary tool pad holders which were mounted within CNC tool holders. In some embodiments, leveraging of a CNC mill to provide consistent pressure, consistent movements, and predictable and thorough strategic coverage may create a combination of activities that produce very desirable and consistent finishes very quickly.

With continued reference to FIG. 1, abrasive polishing tools 128 may also include, without limitation, abrasive scouring pads and polishing sponges of different known grits may be pre-manufactured in custom, optimized shapes, and sizes (circles of different diameters, balls, cylinders, cones, etc.), already fastened to shafts to be immediately used within a mill. These varieties of shapes may be designed to polish all necessary geometries found within mold bases as efficiently and effectively as possible and toolpaths may then also be optimized to match the optimized shapes.

With continued reference to FIG. 1, processor 104 may determine a reachable area 136 of the at least a surface as a function of the polishing tool. As used in the current disclosure, a "reachable area" is an area of a surface to which a polish tool can apply a finish assignment. Reachable area 136 may be determined as a function of polish strategy 120, polishing tool 128 selection, one or more dimensions of part for manufacture 112, and/or finish assignment 116. In embodiments, reachable area 136 may be denoted by computer model 108. In other embodiments, reachable area 136 may be calculated using an area machine learning model 132. Determining reachable area 136 may include classifying one or more selected surfaces into, without limitation, shallow, steep, and/or general depending on their draft amount. Sets of surfaces maybe partitioned accordingly such that different polish tools 128 and polish strategies 120 for the different classifications may be utilized. Determining reachable area 136 may also include dividing each surface into reachable and unreachable regions using collision testing of the tool model and mold component model. The regions may be stored as polygons in the UV domain of the NURBS surface being evaluated. Additionally, a determination of reachable area 136 includes post-processing that may be performed on the reachable regions of the surface according to the tool design. This may be done to prevent moving the tool across geometries which may damage it, such as repeatedly passing over a sharp fin of material. The reachable regions of the face may then be color-coded to show the designer where subsequent tools may need to be used, for instance, narrow slots that a larger diameter tool cannot fit inside. A user may apply tools of decreasing diameter or increasing length as needed until all surfaces requiring polish are assigned. In an embodiment, when applying subsequent tools, only the regions previously unreachable may be considered and assigned for polishing.

With continued reference to FIG. 1, reachable area 136 may be calculated using an area machine learning model 132. In embodiments, an area machine learning model 132 may include a classifier, which may be consistent with the classifier disclosed with reference to FIG. 3. Inputs to the area machine learning model may include a computer model 108 of part for manufacture 112, a finish assignment 116, examples of polish strategy 120, polishing tools 128 available, examples of past polishing tool selections 128, examples polish recipes, examples of reachable area 136, examples of toolpaths 140, and the like. An output of an area machine learning model may be a reachable area 136 that reflects the current part for manufacture 112 or toolpath 140. Area machine learning model 132 may by trained using area training data. Area training data may include a plurality of data entries containing a plurality of inputs that are correlated to a plurality of outputs for training a computing device 104 by a machine-learning process. Area training data may include examples of computer model 108, examples of finish assignment 116, examples of polish recipes, examples of other polish strategy 120, polishing tools 128 available, examples of past polishing tools 128, examples of reachable area 136, examples of toolpaths 140, and the like. Area training data may include correlations between past polish strategy 120, past polishing tool 128 and past reachable area 136, past toolpaths 140. In some embodiments, area training data may include correlations between a past computer model 108 and a past reachable area 136 and/or past toolpath 140. "Past," refers to the fact that the data was collected prior to the current reachable area 136; however, past reachable area 136 and past toolpaths 140 need not have been calculated by processor 104. Area training data may be stored in a database, such as a training data database, or remote data storage device, or a user input or device.

Still referring to FIG. 1, polishing strategy 120 may be included within a polish recipe. As used in the current disclosure, a "polish recipe" is specified sequence of toolpath Steps that are executed in order to achieve a desired finish. Each step contains several parameters that control the abrasive grit of the tool used and the shape, position, and characteristics of the toolpath generated for the Step. This sequence of Steps may be referred to as a Recipe. In the design application, these Steps may be codified in human readable resource files that are easily modifiable without changes to source code. This allows engineers to quickly iterate on grit progression and toolpath parameters without the need for application code changes. Still referring to FIG. 1, in some embodiments, parameters of one or more steps of a polish recipe may include, without limitation, RPM. RPM may include a speed at which a tool may spin during a point of a toolpath. In some embodiments, parameters of one or more steps of a polish recipe may include a feed rate. A "feed rate" as used in this disclosure is a rate at which a tool moves over a surface in inches per minute. In some embodiments, parameters of one or more steps of a polish recipe may include a repeat count. A "repeat count" as used in this disclosure is a quantity of times a tool may perform a current step of a toolpath. In some embodiments, one or more parameters of one or more steps of a polish recipe may include a step over. A "step over" as used in this disclosure is a distance between subsequent toolpath strokes in inches. In some embodiments, a parameter of a polish recipe may include a step down. A "step down" as used in this disclosure is a distance between subsequent toolpath strokes in inches in a negative direction. In some embodiments, a parameter of a polish recipe may include a step up. A "step up" as used in this disclosure is a distance between subsequent toolpath strokes in inches in a positive direction. In some embodiments, a parameter may include a translate z parameter. A "translate z parameter" as used in this disclosure is a direction and distance a toolpath is positioned to. In some embodiments, a parameter of a polish recipe may include a tool radius offset. A "tool radius offset" as used in this disclosure is a difference between a virtual tool radius and an actual tool radius. In some embodiments, a parameter of a polish recipe may include a shallow toolpath type, steep toolpath type, and/or other geometries of a toolpath. A polish recipe Step may be written in the following form: polishing tool 128, polish strategy 120, Toolpath Type, RPM, Feed Rate, Step over/step down, Translate Z. In a non-limiting example a polish recipe Step may be written as Step 1: 220 Grit Tool, Shallow Toolpath Type: PPM, RPM: 5000, Feed: 250, Step Over: 0.068", Translate Z: −0.005". In another example a polish recipe Step may be written as Step 2: 320 Grit Tool, Shallow Toolpath Type: PPM, RPM: 5000, Feed: 400, Step Over: 0.039", Translate Z: −0.0055". Polish recipe steps are then combined to create polish recipes.

With continued reference to FIG. 1, processor 104 may generate a toolpath 140 as a function of the reachable area 136. As used in the current disclosure, a "toolpath" is a path through space that the tip of a manufacturing tool follows on its way to producing the desired geometry or polish of the workpiece. In some cases, toolpath 140 may include one or more sets of directions for polishing tool 128, such as, but not limited to, pressure, direction, location and the like, in which polish tool 128 may be applied to a surface. In some cases, processor 104 may transmit toolpath 140 to a tool, for example for manufacturing of a part based upon computer model 108. In some embodiments, processor 104 may be communicative with tool by way of one or more networks, for example networks. In an embodiment toolpath 140 may be determined using an area machine learning model 132.

With continued reference to FIG. 1, generating a toolpath 140 may additionally include geometric inputs consisting of a mesh representation of the mold component with each facet tagged as "to cut" or "to avoid" may be constructed. Additional "blocking" meshes may also be created for features that should be avoided, like ejector pin and sprue holes. Toolpaths 140 may be designed for use of polishing tools 128 as described above. Tool paths 140 may attempt to replicate motions a person would use to polish with an abrasive polishing tools 128. This may include involuntary random directional changes that naturally occur during manual polishing. One issue when using square polishing stones is that the flat side should be orientated to match the angle of an adjacent wall. Measuring a square from corner to corner is larger than face to face. If not accounted for this may lead to collisions or incomplete polishing. This may be avoided using spindle orientation. This may be done in various ways on different versions and brands of CNC machines. For example, on HAAS mills this is controlled with M19 followed by a P # or R #. P allow for full angles like 30 degrees, while R allow for angles and minutes to be defined. In another example, on the DMG Mori which may be slightly different, first the 4096 may be divided by the desired angle then assigned to variable #1133, followed by a M119; call. A program may use the same 3 passes at slightly different angles first introduced during. This approach may attempt to simulate a random scratch pattern produced manually. Zig Zag paths and/or Zig Zag raster style paths may be applied to freeform surfaces such as, but not limited to, shut off ramps, whereas vertical paths may be applied to vertical walls. In some embodiments, Zig Zag paths may be applied to gradual transitions like a shut off ramp where a pivot tool is not available, whereas vertical paths may be used on vertical walls. An ideal tool path may replace parallel motions and perpendicular step overs with a series of shallow angles bouncing back and forth between the edges.

With continued reference to FIG. 1, toolpaths 140 that include draw polishing walls with a floating holder may be problematic when there is no supporting geometry below it, the tool fully extends. This results in a tool that is longer than the machine expects. As the mill starts moving over the transition there may be no Z component vector to compress the stone axially. The polishing stone may deflect radially. The pivot may take up all the radial deflection until a Z vector develops with sufficient force to compress the axial spring again. Downward paths may not have this issue. The tool may fully extend when there is no geometry supporting it from below, but in this case the tool does not need to deflect radially to follow the path. Between passes the tool may be lifted off a part and rapidly relocate back to a beginning of a path. In some embodiments, toolpath 140 may include a zig zag movement, which maintains contact with a part in both directions.

Still referring to FIG. 1, based on toolpaths 140 and machining requirements for any given mold, a "tool sheet" may be generated and printed which may include a list of all necessary cutting tool IDs (drills, endmills, taps, polishing tools 128, etc.) to be loaded into a mill to manufacture a given mold base. In embodiments, a list may be utilized by a milling operator who collects the necessary set of tools and subsequently loads them into a mill which was selected to machine the mold base. Necessary polishing tools may be automatically identified upstream and added to a list and employed in a similar fashion.

Figure 2:
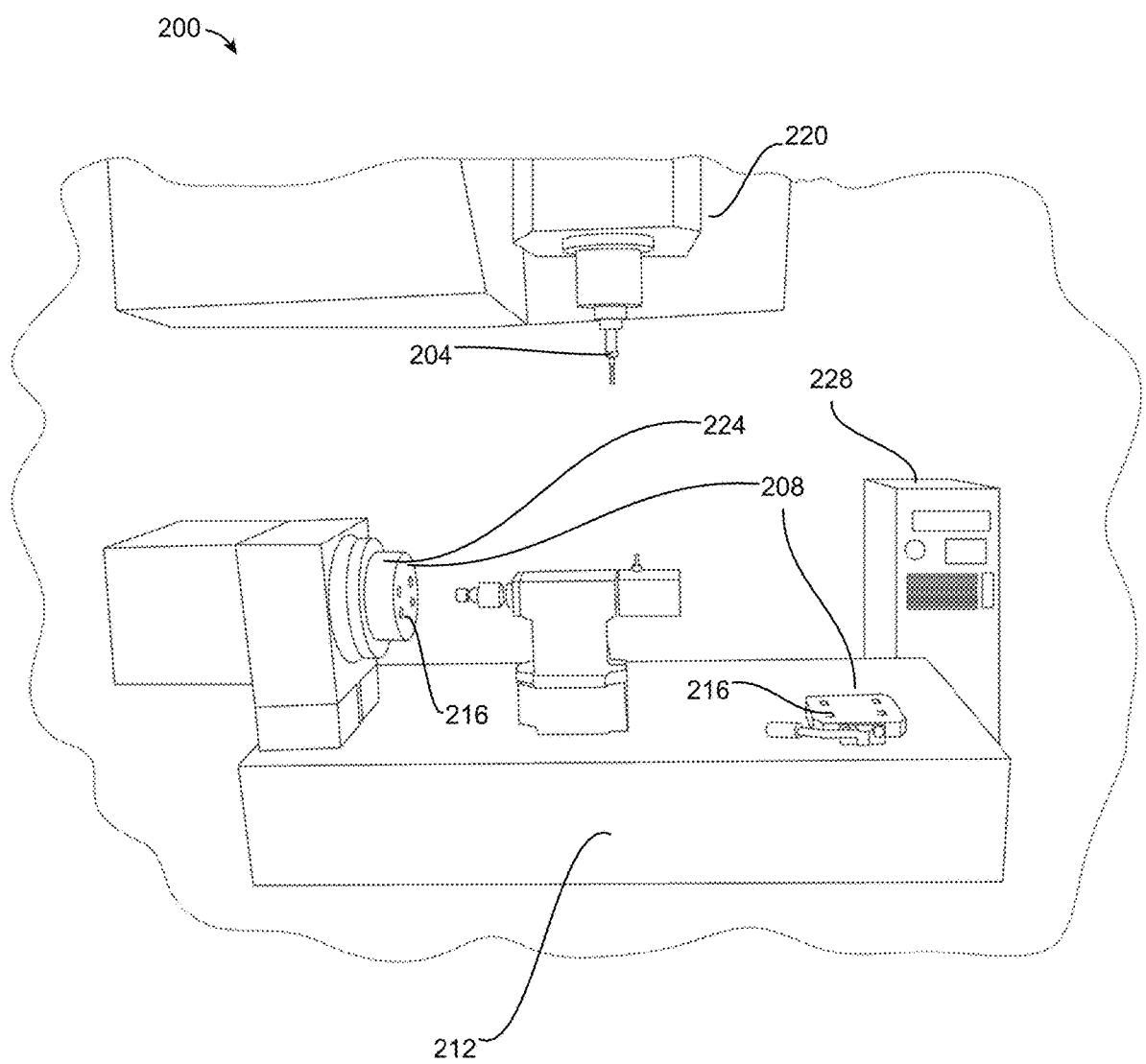
FIG. 2 is a schematic diagram illustrating an exemplary embodiment of a manufacturing environment.

Turning now to FIG. 2, an exemplary embodiment of a manufacturing system 200 that may be used in some embodiments to perform one or more manufacturing or computer modeling steps in embodiments of methods is illustrated. Manufacturing system 200 may include at least a manufacturing tool 204; in an embodiment, manufacturing tool 204 may be a component of manufacturing system 200 that performs one or more manufacturing steps as described above. Manufacturing tool 204 may perform one or more subtractive manufacturing steps as described above. Manufacturing tool 204 may include a cutting tool. Cutting tool may be a component that removes material from a workpiece. In some embodiments, cutting tool includes at least an endmill, which may be a component that removes material when rotated against a workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate.

Continuing to refer to FIG. 2, manufacturing tool 204 may include a tool changer that can switch a plurality of endmills onto and off of manufacturing tool 204; for instance, tool changer may detach an endmill currently attached to a spindle and attach a different endmill to the same spindle, enabling the automated manufacturing system 200 to use more than one endmill in a single automated manufacturing process. Manufacturing tool 204 may include a tool changer that can switch a plurality of endmills onto and off of manufacturing tool 204. Manufacturing tool 204 may include a component used to perform EDM, such as a wire for wire EDM or an electrode. Manufacturing tool 204 may include one or more lasers. Manufacturing tool 204 may include one or more abraders.

Alternatively or additionally, and further referring to FIG. 2, manufacturing tool 204 may include at least an additive manufacturing tool capable of performing one or more additive manufacturing steps as described above. Manufacturing tool 204 may, as a non-limiting example, include one or more additive printer heads such as those used in rapid prototyping and/or "3D printing" processes, or the like. Manufacturing tool 204 may include an extruding device for extruding fluid or paste material, a sprayer or other applicator for bonding material, an applicator for powering, a sintering device such as a laser, or other such material. Furthermore, discrete object may be formed from precursor to a discrete object 304 by additive manufacturing.

Still referring to FIG. 2, manufacturing system 200 may include a support 208. In an embodiment, a support 208 may be a structure that supports a workpiece during the one or more manufacturing steps. Support 208 may include a base table 212. Base table 212 may include a surface to which a workpiece or other components may be secured. Surface may be oriented horizontally, vertically, or in any other orientation. Surface may be substantially planar. Base table 212 may include various mechanisms to attach components or workpieces to base table 212; for instance, base table 212 may include a quick release attachment mechanism that can be used to attach any component having appropriate attachment features such as quick-release studs. Support 208 may include a fixture, which has used herein is a component used in a manufacturing device to secure a workpiece to the manufacturing device during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in manufacturing system 200 by a plurality of fixtures, such as a plurality of bolts. Support 208 may include a vise, clamp, or other component used to locate or immobilize a workpiece within or at manufacturing system 200.

Still referring to FIG. 2, support 208 may include a substrate for deposition of layers in additive processes. Substrate may be constructed of any material suitable for an additive process to be performed on top of substrate. For instance, and without limitation, substrate may include a metal or other heat-resistant base plate supporting additively added layers in metal additive processes such as DMLS or other laser sintering. Substrate may include a tray structure, e.g. for keeping powder layers used in powder fusion processes from blowing away or spilling during deposition. Substrate may include a fluid bath or other structure for bathing or coating a workpiece with successive layers, as in stereolithography or the like.

With continued reference to FIG. 2, manufacturing system 200 may include at least a locating feature 216. In an embodiment, at least a locating feature 216 may be at least a feature of manufacturing system 200 that enables a workpiece to be located at manufacturing system 200; in some embodiments, the at least a locating feature 216 enables a workpiece to be located precisely with regard to a coordinate system used to direct the one or more steps. At least a locating feature 216 may include, without limitation, one or more vices, clamps, projections, slots, recesses, or walls; for instance, the at least a locating feature 216 may include a surface of a vise jaw that is immobile with respect to another component such as a support 208 or base table 212, enabling precise prediction of surface's location, and thus of a workpiece surface set against it. At least a locating feature 216 may include a locating feature 216 on support 208; for example, the at least a locating feature 216 may include a bolt-hole, stud-hole, groove, or other recess in a base table 212, trunnion table, or fixture. As a non-limiting example, at least a locating feature 216 may include one or more grooves in a vice. At least a locating feature 216 may include a projection on a base table 212, trunnion table, or fixture. At least a locating feature 216 may include a combination of recesses and projections. The at least a locating feature 216 may include a plurality of locating features, or a single locating feature.

Continuing to refer to FIG. 2, in an embodiment, manufacturing system 200 may be a mechanical manufacturing device. In an embodiment, mechanical manufacturing device may be a manufacturing system 200 that deprives the user of some direct control over the toolpath, defined as movements the manufacturing tool 204 and workpiece make relative to one another during the one or more manufacturing steps. For instance, manufacturing tool 204 may be constrained to move vertically, by a linear slide 220 or similar device, so that the only decision the user may make is to raise or lower the manufacturing tool 204; as a non-limiting example, where manufacturing system 200 is a manually operated machine tool, user may only be able to raise and lower a cutting tool, and have no ability to move the cutting tool horizontally. Similarly, where manufacturing tool 204 includes a slide lathe, a blade on the slide lathe may be constrained to follow a particular path. As a further example, base table 212 may be moveable along one or more linear axes; for instance, base table 212 may be constrained to move along a single horizontal axis. In other embodiments, base table 212 is constrained to movement along two horizontal axes that span two dimensions, permitting freedom of movement only in a horizontal plane; for instance, base table 212 may be mounted on two mutually orthogonal linear slides.

With continued reference to FIG. 2, manufacturing system 200 may include a powered manufacturing device. In an embodiment, a powered manufacturing device may be a manufacturing device in which at least one component of the manufacturing device includes at least a component powered by something other than human power. At least a component may be powered by any non-human source, including without limitation electric power generated or stored by any means, heat engines including steam, internal combustion, or diesel engines, wind power, waterpower, pneumatic power, or hydraulic power. Powered components may include any components of manufacturing system 200. Manufacturing tool 204 may be powered; for instance, manufacturing tool 204 may include an endmill mounted on a spindle rotated by a motor (not shown). Workpiece support 208 may be powered. Where manufacturing system 200 is a mechanical device, motion of components along linear or rotary constraints may be powered; for instance, motion of base table 212 along one or more linear constraints such as linear slides may be driven by a motor or other source of power. Similarly, rotation of a table may be driven by a power source. Tool-changer, where present, may be driven by power. In some embodiments, all or substantially all of the components of manufacturing system 200 are powered by something other than human power; for instance, all components may be powered by electrical power.

Still referring to FIG. 2, manufacturing system 200 may include an automated manufacturing device 224. In some embodiments, an automated manufacturing system is a manufacturing device including a controller that controls one or more manufacturing steps automatically. A controller may include a sequential control device that produces a sequence of commands without feedback from other components of subtractive manufacturing device. Controller may include a feedback control device that produces commands triggered or modified by feedback from other components. Controller may perform both sequential and feedback control. In some embodiments, controller includes a mechanical device. In other embodiments, controller includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described in this disclosure.

Continuing to refer to FIG. 2, a controller may include a component embedded in manufacturing system 200; as a non-limiting example, the controller may include a microcontroller, which may be housed in a unit that combines the other components of manufacturing system 200. Further continuing the example, microcontroller may have program memory, which may enable microcontroller to load a program that directs manufacturing system 200 to perform an automated manufacturing process. Similarly, controller may include any other components of a computing device as described in this disclosure in a device housed within manufacturing system 200. In other embodiments, controller includes a computing device that is separate from the rest of the components of manufacturing system 200; for instance, the controller may include a personal computer, laptop, or workstation connected to the remainder of manufacturing system 200 by a wired or wireless data connection. As a non-limiting example, automated manufacturing device 224 may include a controller, which may be coupled to other features thereof via network; in an embodiment, controller may not be currently coupled to other materials, such that automated manufacturing device 224 may include only controller. In some embodiments, controller includes both a personal computing device where a user may enter instructions to generate a program for turning workpiece into a finished product, and an embedded device that receives the program from the personal computing device and executes the program. A person of ordinary skill in the art will readily appreciate, after reading the instant application in its entirety, the various ways that a controller, which may include one or more computing devices, may be connected to or incorporated in a manufacturing system 200 as described above.

With continued reference to FIG. 2, processor 104 may control components of manufacturing system 200; for instance, processor 104 may control elements including without limitation tool changer to switch endmills, spindle or gear systems operatively coupled to spindle to regulate spindle rotational speed, linear movement of manufacturing tool 204, base table 212, or both. As an example, in embodiments involving subtractive manufacturing, the equipment used for removing material may be of the computerized numerical control (CNC) type that is automated and operates by precisely programmed commands that control movement of one or more parts of the equipment to affect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Persons skilled in the art, upon reading the entirety of this disclosure, will be aware of similar automated control systems usable for various forms of additive manufacturing.

Still referring to FIG. 2, processor 104, automated manufacturing system 200, and/or automated manufacturing device 224 may be configured to perform any manufacturing modeling and/or other method step as disclosed herein. In an embodiment, processor 104 is configured to receive a graphical representation of precursor to a discrete object, receive a graphical representation of at least a reference feature on the precursor to the discrete object, and generate a computer model of the body of material, wherein the computer model of the body of material includes the graphical representation of the precursor to the discrete object and the graphical representation of the at least a reference feature. As a further non-limiting example, processor 104, automated manufacturing system 200 and/or automated manufacturing device 224 may be designed and configured to manufacture a body of material including a precursor to a discrete object and at least a reference feature, where manufacturing the body of material includes receiving, at the automated manufacturing system, at least a precursor to a discrete object, a graphical computer model of the at least a precursor to the discrete object, and a graphical computer model of the discrete object, automatedly detecting, by the automated manufacturing system, at least a critical-to-quality feature in the graphical computer model of the discrete object, automatedly generating, at the automated manufacturing system, a graphical representation of the at least a reference feature on a graphical model of the precursor to the discrete object as a function of the at least a critical-to-quality feature, manufacturing, by the automated manufacturing system, the at least a reference feature on the at least a precursor, as a function of the graphical representation of the at least a reference feature, and forming the discrete object from the body of material at a subtractive manufacturing device when the body of material is located at the subtractive manufacturing device using the at least a reference feature, wherein forming further comprises forming the at least a critical-to-quality feature. As a further non-limiting example, processor 104, automated manufacturing system 200 and/or automated manufacturing device 224 may be designed and configured to manufacture a body of material including a precursor to a discrete object and at least a reference feature, where manufacturing the body of material includes receiving at least a precursor to a discrete object, a graphical computer model of the at least a precursor to the discrete object, and a graphical computer model of the discrete object, automatedly detecting at least a critical-to-quality feature in the graphical computer model of the discrete object, and automatedly generating, at the automated manufacturing system, a graphical representation of the at least a reference feature on a graphical model of the precursor to the discrete object as a function of the at least a critical-to-quality feature. As a further non-limiting example, processor 104, automated manufacturing system 200, and/or automated manufacturing device 224 may be designed and configured to receiving a graphical computer model of the discrete object to be manufactured; automatedly detect at least a critical-to-quality feature in the graphical computer model of the discrete object, and amend the graphical computing model of the discrete object to include an identification of the at least a critical-to-quality feature.

In some embodiments, and still referring to FIG. 2, a system for automated polishing may be configured and/or operated by leveraging existing and imbedded PMD toolpathing and CNC machines for polishing. Polishing may alternatively or additionally be performed using a subset of dedicated polishing mills, robots, or cobots. However, use of general purpose and/or previously existent CNC mills and set-ups may enable polishing tools to be loaded alongside milling tools and to be called to action when ready with no operator intervention; in other words, an automated set of instructions and/or toolpaths may incorporate polishing as a portion thereof, which may be entered into after, before, and/or in between milling, drilling, and/or cutting steps, potentially within a single setup. In addition, incorporation of polishing tools and/or processes in existing and/or general purpose CNC machines may allow the immediate use existing CNC machine stocks as drop-in automated polishers, exponentially increasing scalability of such processes. Currently, based on toolpaths and machining requirements for any given mold, a "tool sheet" may be generated and printed which contains a list of all necessary cutting tool IDs such as drills, end mills, taps, or the like to be loaded into the mill to manufacture a given mold base. This list is may then be utilized by a milling operator and/or automated and/or robotic device to collect necessary set of tools and subsequently load them into a mill which is selected to machine a mold base. In some embodiments described herein, necessary polishing tools may be automatically identified upstream and added to this same list along with cutting tools and employed in the same fashion.

With continued reference to FIG. 2, prior to polishing routines becoming g-code that a CNC mill can execute, polishing assignments may be created to dictate that code. Such polishing toolpaths, similarly, to machining toolpaths, may be automatically generated based on Designer selections and assignments. Similarly, assignment of surface finishes may occur within PMD or similar applications and/or environments. Any given part and/or mold may have numerous different surface finishes assigned to different areas of a part and/or mold. These assignments for certain surfaces or geometries of a mold may automatically trigger a polishing procedure necessary to create that eventual surface finish during polishing tool pathing. For instance, if a customer wants one side of their part to be a "F1" surface finish and they want an opposite side of their part to be an "A2" surface finish, this request may be digitally assigned within PMD and/or automatic manufacturing device during mold design. Continuing the example, upon creation of an NC File and/or other file containing g-code for a machining/polishing execution, tools and/or strategies to create an "F1" and "A2" surface finish may be automatically generated based on pre-baked routines for those surface finishes. Each available surface finish, such as without limitation F1, B1, C1, A2, and beyond, may have its own pre-baked routines and associated tools to fulfill when assigned. FIG. 2 illustrates a typical hand-polishing process. Toolpaths and traversals that best replicate how a human would perform the activity may be performed may be created, albeit with consistency and predictability as offered by a CNC machine. A spindle may be held at a single orientation, not spinning so the stones and/or abrasives may be dragged and polish in a linear fashion as they are normally used. It may be possible to reach any desired surface finish by replicating a linear polishing and progression that a typical human build technician would apply.

Figure 3:
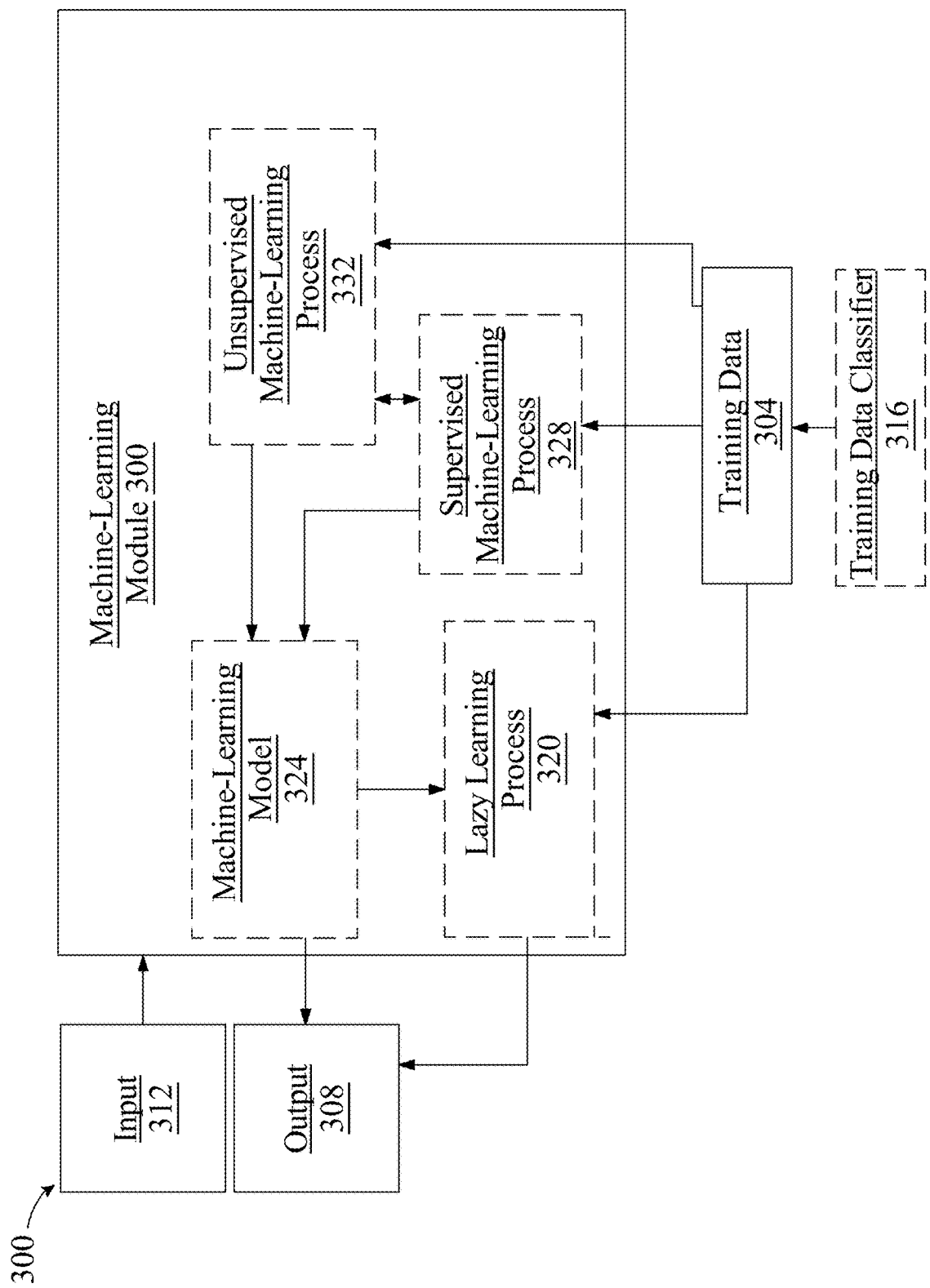
FIG. 3 is an exemplary block diagram of machine learning model.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include tool paths and/or polish strategies as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

For example, and still referring to FIG. 3, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Referring now to FIG. 4, a chisel-shaped end embodiment is illustrated for exemplary purposes. Floating holders work effectively on horizontal flat surfaces. A different approach may be used for vertical walls and/or walls having a vertical or z-axis variation. This may involve two polishes: cross polish (parallel to the parting line) and draw polish (perpendicular to the parting line). Draw polish may require a mill to maintain Z control which may mean a tool holder with a fixed length. Fixed length indicates that weight may not be used to generate necessary pressure. A spring or biasing means may be used, but if a tool holder can deflect in the same direction a spindle is traveling, then a tool can drag behind a centerline of the spindle and result in incomplete polishing at the end of each stroke. This indicates that a tool holder may be flexible in one plane to generate the pressure, but stiff perpendicular to that plane. A further useful property may include an ability to twist; twisting may allow for good surface contact despite the potential for minor misalignments between the stone and the mold surface. A simple flexible blade may meet all these requirements.

Still referring now to FIG. 4, in some embodiments, where using files that are heat treated to make the files very hard, which makes the files brittle, the files may be softened prior to use. A steel color method may be used to determine tempering temperature of the steel, for instance targeting blues and purples because those are the colors associated with the temper of a spring or flexible scraper. One of the challenges with this tool holder is that tip may follow an arc as the deflection changes. For instance, a tool may measure 6" in length when un-deflected, but 5.81" when deflected. If we underestimate how the length has changed, we risk a collision at the base of the walls. Overestimate and the tool could lift past the parting line causing the spring to unload and return to the un-deflected position. This may result in a collision on the down stroke. To avoid the potential for a collision tool may be kept below the parting line. Alternatively, a stone may be shaped stone into a long chisel.

Referring now to FIG. 5, an exemplary embodiment of polishing tools 128 is shown. The First polishing tool 500A, shown in FIG. 5A, is modeled like a flat endmill with an abrasive pad on the side of the tool. A second polishing tool 500B is shown in FIG. 5B. In some embodiments, polishing tools 128 may be modeled like a ball endmill with a curved abrasive pad. A person reasonably skilled in the art, after having reviewed the entirety of this disclosure, would understand the plurality of embodiments a polishing tool 128 may take on.

Figure 6:
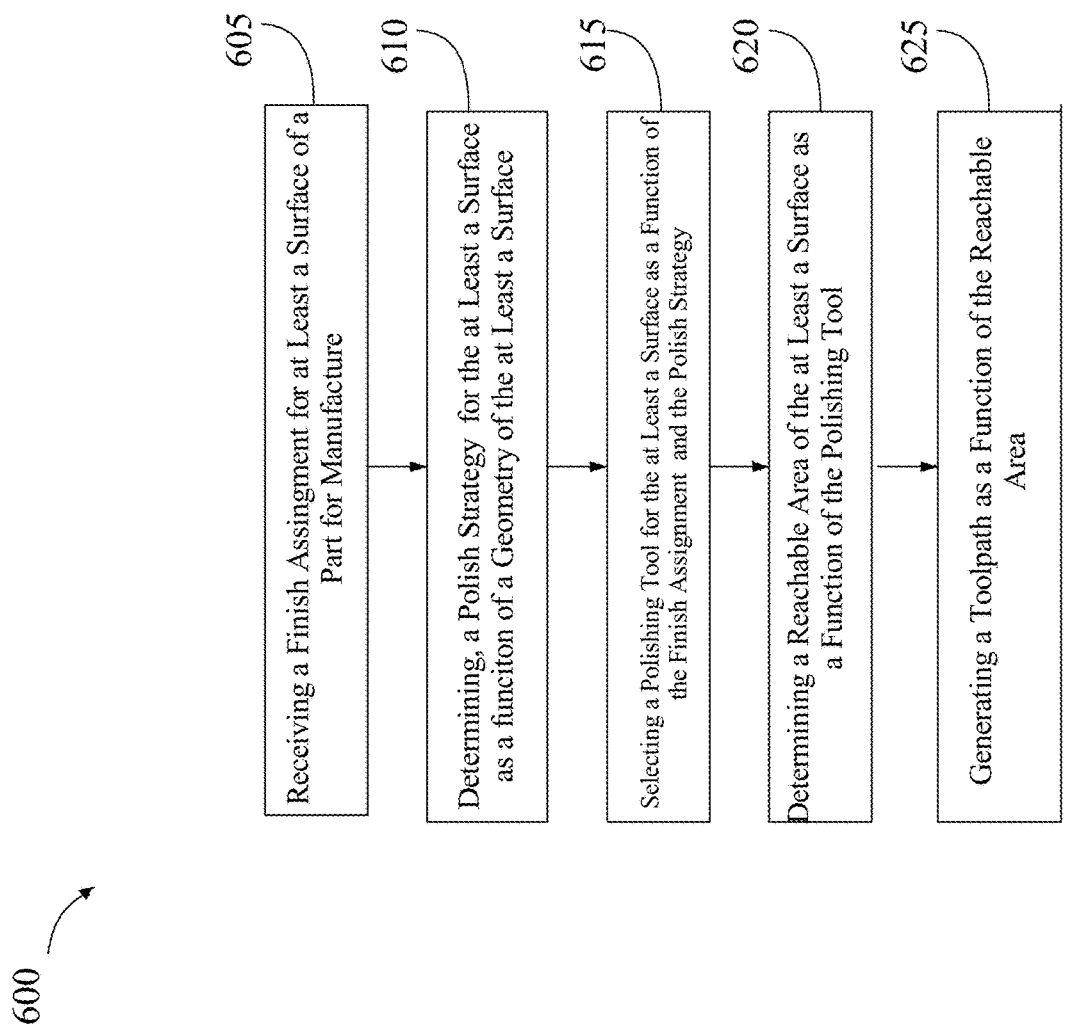
FIG. 6 is a flow diagram of an exemplary method for automated mold polishing.

Referring now to FIG. 6, an exemplary method for automated mold polishing. At Step 605, a processor receives a finish assignment for at least a surface of a part for manufacture; This may be implemented as described with reference to FIGS. 1-6. The processor may further be configured to receive a computer model of a part for manufacture, wherein the computer model comprises the finish assignment. The at least a surface may comprise a plurality of surfaces.

At step 610, A processor determines a polish strategy for the at least a surface as a function of a geometry of the at least a surface; This may be implemented as described with reference to FIGS. 1-6. The polish strategy may be determined using a polish machine learning model configured to take the geometry of the at least a surface as an input and to output the polish strategy. This may be implemented as described with reference to FIGS. 1-6. A polish recipe may be partially comprised of the polish strategy.

At step 615, A processor selects a polishing tool for the at least a surface as a function of the finish assignment and the polish strategy for the at least a surface; This may be implemented as described with reference to FIGS. 1-6. The polishing tool may comprise a plurality of polishing tools. A polish tool may include a polish stone.

At step 620, A processor determines a reachable area of the at least a surface as a function of the polishing tool. This may be implemented as described with reference to FIGS. 1-6. The processor may then partition the plurality of surfaces into partitioned sets as a function of the finish assignment and the polish strategy for each surface of the plurality of surfaces. This may be implemented as described with reference to FIGS. 1-6. The processor may iteratively generate a reachable area of each partitioned set of faces of the partitioned sets of faces as a function of each polishing tool of the plurality of polishing tools. This may be implemented as described with reference to FIGS. 1-6. The reachable area may be determined using an area machine learning model configured to take the selection of the polishing tool as an input and to output the reachable area. This may be implemented as described with reference to FIGS. 1-6.

A step 625, a processor generates a toolpath as a function of the reachable area. This may be implemented as described with reference to FIGS. 1-6. The processor may then be configured optimize the toolpath generation by ensuring that generation of a toolpath is not duplicated. This may be implemented as described with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
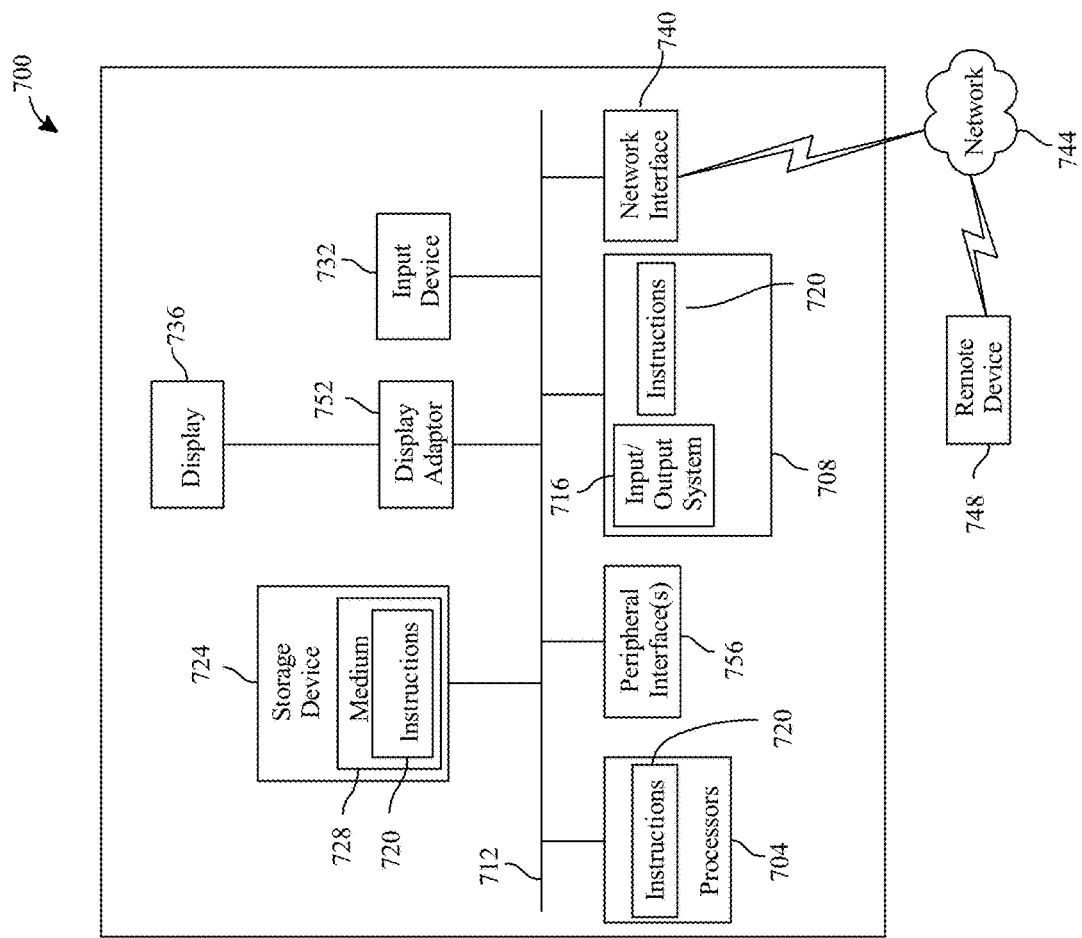
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for automated mold polishing, the apparatus comprising:
   at least a processor; and
   a memory communicatively connected to the at least a processor, the memory containing instructions configuring the at least a processor to:
   receive a finish assignment for at least a surface of a part for manufacture;
   input a surface geometry into a polish machine learning model iteratively trained to derive inferences between polishing tool pressures and surface finishes in training data and receive a polish strategy as an output of the polish machine learning model;
   select a polishing tool for the at least a surface as a function of the finish assignment and the polish strategy for the at least a surface;
   determine a reachable area of the at least a surface as a function of the polishing tool;
   generate a toolpath comprising a sequence of grit progressions and movement steps as a function of the reachable area; and control an automated manufacturing device to execute the toolpath.

2. The apparatus of claim 1, wherein the at least a processor is further configured to receive a computer model of a part for manufacture, wherein the computer model comprises the finish assignment.

3. The apparatus of claim 1, wherein the at least a surface comprises a plurality of surfaces.

4. The apparatus of claim 1, wherein the toolpath includes a pressure level.

5. The apparatus of claim 3, wherein the at least a processor is further configured to:
   partition the plurality of surfaces into partitioned sets as a function of the finish assignment and the polish strategy for each surface of the plurality of surfaces; and
   iteratively generate a reachable area of each partitioned set of faces of the partitioned sets of faces as a function of each surface of the plurality of surfaces.

6. The apparatus of claim 1, wherein the at least a processor is further configured to optimize the toolpath generation by ensuring that generation of a toolpath is not duplicated.

7. The apparatus of claim 1, wherein the polish machine learning model utilizes a linear regression model that minimizes the difference between predicted surface roughness and actual surface roughness.

8. The apparatus of claim 1, wherein the reachable area is determined using an area machine learning model configured to input the selection of the polishing tool and output the reachable area.

9. The apparatus of claim 1, wherein the geometry of the at least a surface includes a surface roughness.

10. The apparatus of claim 1, wherein the toolpath includes a zig zag movement.

11. A method for automated mold polishing, the method comprising:
    receiving, using a processor, a finish assignment for at least a surface of a part for manufacture;
    inputting, using the processor, a surface geometry into a polish machine learning model iteratively trained to derive inferences between polishing tool pressures and surface finishes in polishing training data and receive a polish strategy as an output of the polish machine learning model;
    selecting, using the processor, a polishing tool for the at least a surface as a function of the finish assignment and the polish strategy for the at least a surface;
    determining, using the processor, a reachable area of the at least a surface as a function of the polishing tool; and
    generating, using the processor, a toolpath comprising a sequence of grit progression and movement steps as a function of the reachable area; and
    controlling, using the processor, an automated manufacturing device to execute the toolpath.

12. The method of claim 11, receiving, using a processor, a computer model of a part for manufacture, wherein the computer model comprises the finish assignment.

13. The method of claim 11, wherein the at least a surface comprises a plurality of surfaces.

14. The method of claim 11, wherein the toolpath includes a pressure level.

15. The method of claim 14, wherein the at least a processor is further configured to:
    partitioning, using the processor, the plurality of surfaces into partitioned sets as a function of the finish assignment and the polish strategy for each surface of the plurality of surfaces; and
    iteratively generating, using the processor, a reachable area of each partitioned set of faces of the partitioned sets of faces as a function of each surface of the plurality of surfaces.

16. The method of claim 11, optimizing, using the processor, the toolpath generation by ensuring that generation of a toolpath is not duplicated.

17. The method of claim 11, wherein the polish machine learning model utilizes a linear regression model that minimizes the difference between predicted surface roughness and actual surface roughness.

18. The method of claim 11, wherein the reachable area is determined using an area machine learning model configured to take the selection of the polishing tool as an input and to output the reachable area.

19. The method of claim 11, wherein the geometry of the at least a surface includes a surface roughness.

20. The method of claim 11, wherein the toolpath includes a zig zag movement.

* * * * *